UNITED STATES PATENT OFFICE.

HEINRICH OPPERMANN, OF BERNBURG, GERMANY.

PROCESS OF MAKING MAGNESIUM SUPEROXID.

SPECIFICATION forming part of Letters Patent No. 650,023, dated May 22, 1900.

Application filed July 11, 1899. Serial No. 723,482. (No specimens.)

*To all whom it may concern:*

Be it known that I, HEINRICH OPPERMANN, a citizen of the German Empire, residing at Bernburg, in the Duchy of Anhalt, Germany, have invented certain new and useful Improvements in Processes for the Production of Superoxid of Magnesium; and I do hereby declare the following to be a full, clear, and exact description of the invention, such as will enable others skilled in the art to which it appertains to make and use the same.

It is well known that hydrate of magnesium suspended in water with hydrogen superoxid will form magnesium superoxid and that the latter will also be produced by introducing finely-powdered sodium superoxid into a solution of a magnesium salt in water. The superoxids so obtained are, however, very unstable, being easily decomposed, giving up free oxygen.

The present invention relates to a process for the production of stable magnesium superoxid combinations, such a process not being known up to the present time, and is as follows: First magnesium hydrate or basic magnesium carbonate or similar material is moistened to such an extent only that it still retains a powdery form and is then mixed with so much sodium-superoxid powder until heat is produced, indicating a chemical reaction. The heating, however, must be counteracted either by cooling the vessel from the outside or by introducing an excess of cold hydrate-of-magnesium powder or basic-carbonate-of-magnesium powder, so as to avoid decomposition—*i. e.*, the generation of oxygen.

To state an example: Mix ten to twelve parts of sodium superoxid with fifty parts of magnesium-hydrate powder or of magnesium-hydrocarbonate powder. Separately moisten fifty parts of magnesium-hydrate powder or of magnesium-hydrocarbonate powder with water to the extent of half the quantity of the sodium superoxid taken in the first mixture, taking care that a very fine and even distribution of the water in the powder is obtained. Then mix the two sets of powder as rapidly as possible and magnesium superoxid will be formed under heat up to a temperature of 80° centigrade. When the quantity of water used is excessive, the product is unstable, and when it is below the quantity required part of the sodium superoxid will remain unaltered, which, should the product be used suspended in water, would at once induce decomposition. In contact with organic matter this superoxid combination acts as an antiseptic of very great potency and value.

I do not limit myself to the use of magnesium hydrate in carrying out this process, as I may use any chemical equivalent of it in the process, such as basic magnesium carbonate.

Having now described my invention, I claim as new—

1. A process for making stable magnesium superoxid, which consists in first pulverizing magnesium hydrate, then moistening the powder to such an extent only that it still retains its powdery form, and then mixing the moistened powder with dry pulverized sodium superoxid, substantially as set forth.

2. A process for making a stable magnesium superoxid, which consists in mixing moistened magnesium hydrate in pulverescent form with dry pulverized sodium superoxid, and introducing an excess of dry pulverized magnesium hydrate during the reaction so as to reduce the temperature of the mixture below that at which oxygen is liberated, substantially as set forth.

In testimony whereof I affix my signature in presence of two witnesses.

HEINRICH OPPERMANN.

Witnesses:
 WOLDEMAR HAUPT,
 HENRY HASPER.